Dec. 16, 1941.   C. G. FREBORG ET AL   2,266,495
MULTIPLE SELECTING MECHANISM
Filed Sept. 6, 1938   7 Sheets-Sheet 1

INVENTOR.
Carl G Freborg,
Charles A Freborg,
BY
ATTORNEYS

Dec. 16, 1941.     C. G. FREBORG ET AL     2,266,495
MULTIPLE SELECTING MECHANISM
Filed Sept. 6, 1938     7 Sheets-Sheet 2

INVENTOR.
Carl G. Freborg,
Charles A. Freborg,
BY
ATTORNEYS.

Dec. 16, 1941.    C. G. FREBORG ET AL    2,266,495
MULTIPLE SELECTING MECHANISM
Filed Sept. 6, 1938    7 Sheets-Sheet 3

INVENTOR.
Carl G Freborg,
Charles A Freborg,
BY
ATTORNEYS.

Dec. 16, 1941. C. G. FREBORG ET AL 2,266,495
MULTIPLE SELECTING MECHANISM
Filed Sept. 6, 1938 7 Sheets-Sheet 5

INVENTOR.
Carl G Freborg,
Charles A Freborg,
BY
ATTORNEYS

Dec. 16, 1941.    C. G. FREBORG ET AL    2,266,495
MULTIPLE SELECTING MECHANISM
Filed Sept. 6, 1938    7 Sheets-Sheet 6

INVENTOR.
Carl G. Freborg,
Charles A. Freborg,
BY
ATTORNEYS.

Dec. 16, 1941.  C. G. FREBORG ET AL  2,266,495
MULTIPLE SELECTING MECHANISM
Filed Sept. 6, 1938     7 Sheets-Sheet 7

INVENTOR.
Carl G. Freborg,
Charles A. Freborg.
BY
ATTORNEYS.

Patented Dec. 16, 1941

2,266,495

UNITED STATES PATENT OFFICE 2,266,495

MULTIPLE SELECTING MECHANISM

Carl G. Freborg and Charles A. Freborg, Chicago, Ill.; said Charles A. Freborg assignor to Marie E. Freborg, Chicago, Ill.

Application September 6, 1938, Serial No. 228,480

24 Claims. (Cl. 274—10)

This invention relates to improved multiple selecting mechanism and has reference more particularly to selecting mechanism which may be used with automatic phonographs of the multiple record type.

In multiple record phonographs the selected record of a series or group of records is automatically placed in playing position, played and then returned to its position of rest in readiness for another operation. The improved selecting mechanism of the invention has application to automatic phonographs as above described but it is not necessarily limited thereto since the mechanism may be found useful in other arts.

The present selecting mechanism is characterized by a plurality of elements each carrying a plurality of radially movable pins projectable from the periphery of its element and which when projected and properly aligned will be operative to cause a particular record to be played. Each projecting pin is automatically returned to depressed position following the playing of the record selected thereby. A cam plate is associated with each element and said plate is given step by step rotation as a result of the selecting operation to in turn cause a pin to project from the periphery of its element in the event said cam plate has been made operative to produce this result. Following the playing of the selected record the cam plates are again rotated but this time the direction of rotation is reverse to that previously given the cam plates and also this rotation is imparted to the elements which are indexed one notch as a result. This indexing rotation of the elements operates to bring the next selected pin into an operative aligned position and also step by step the cam plates are returned until they eventually reach their initial position when all the selected records have been played. The mechanism is thus in position for another selecting operation.

When applied to a multiple record phonograph the above mechanism makes possible the selection of a plurality of records at one time and is operative to cause said records to be played in the exact order of selection. Accordingly, an object of the present invention resides in providing improved selecting mechanism whereby a plurality of selections can be made at one time and wherein said selections will be rendered in the exact order of their selection.

A further object of the present invention is to provide selecting mechanism which will be normally inoperative for selecting purposes but which is automatically rendered operative by the insertion of a coin or coins in the machine.

A further object is to provide selecting mechanism which will be rendered operative by the insertion of a coin or coins to the extent whereby a number of selections can be made, determined by the number of coins deposited, or the particular denomination of a single coin or both.

Another object is to provide improved selecting mechanism wherein the number of selections that can be made is determined by the number of coins deposited or by the denomination of the coin, or both, and which selecting mechanism will be rendered inoperative for selecting purposes following the selection of the proper number corresponding to the coin or coins so deposited.

In connection with the foregoing object, the present invention contemplates means whereby the selecting mechanism will be rendered inoperative for selecting purposes following the playing of all the selected records, in the event the operator does not complete the selections permitted by the coin or coins deposited in the machine.

A further object of the invention is to provide selecting mechanism which will embody novel means, preventing operation of the phonograph or other apparatus associated with the selecting mechanism, even though a coin has been deposited, until the operator has made the first selection.

Another object is to provide selecting mechanism of the character described which will have electrical connection with the coin, controlled means in such manner that the coin deposited not only determines the number of records that will be played but also the number of selections that may be made on said mechanism.

A further and more specific object of the invention resides in providing selecting mechanism including a plurality of elements corresponding to the total number of selections and wherein each element will have associated therewith a cam plate for causing a selecting pin to project from the periphery of its respective element when said cam plate is rendered operative and actuated to produce this result.

Another object is to provide selecting mechanism for a multiple record phonograph comprising elements having radially movable pins projectable from the periphery thereof and wherein the records to be played are determined by the element selected and wherein the particular pin projected from the periphery of each element determines the order of playing.

A further object is to provide selecting mechanism which will be relatively simple in construction, economical to manufacture and which will not readily get out of order.

With these and other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1:
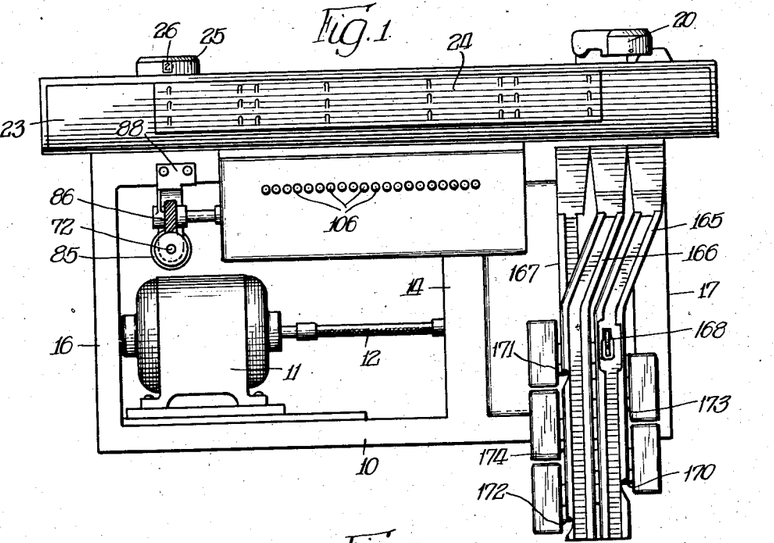
Figure 1 is a front elevational view of a multiple record phonograph embodying the improvements of the present invention.

The framework for housing the multiple record phonograph selected for illustrating the present selecting mechanism consists of a base 10 supporting an electric motor 11 having the flexible driving shaft 12, a top 13, front and rear walls 14 and 15, and end walls 16 and 17. Top 13 is provided with an opening to permit access of the sound reproducer 20 to the record disc 21, supported by turntable 22, Figure 4. Along the front edge of the top a sloping section 23 is provided as a holder 24 for identifying cards, each card having a number and listing the title of a record. The cylindrical cap 25 houses a ring member to which is applied indicia 26 rendered visible by reason of an opening formed in said cap. The ring carrying the indicia is suitably rotated by the selector to be presently described in detail. This structure is provided so that the number of the record being played will be visible to the operator.

Phonograph structure

Figure 2:
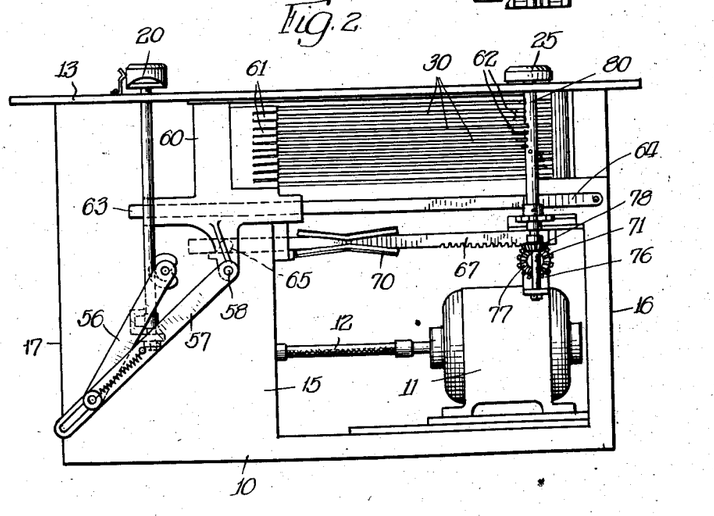
Figure 2 is a rear elevational view of the phonograph of Figure 1 showing the selector for the record carriers and the means for moving the same to and from playing position over the turntable.
Figure 4:
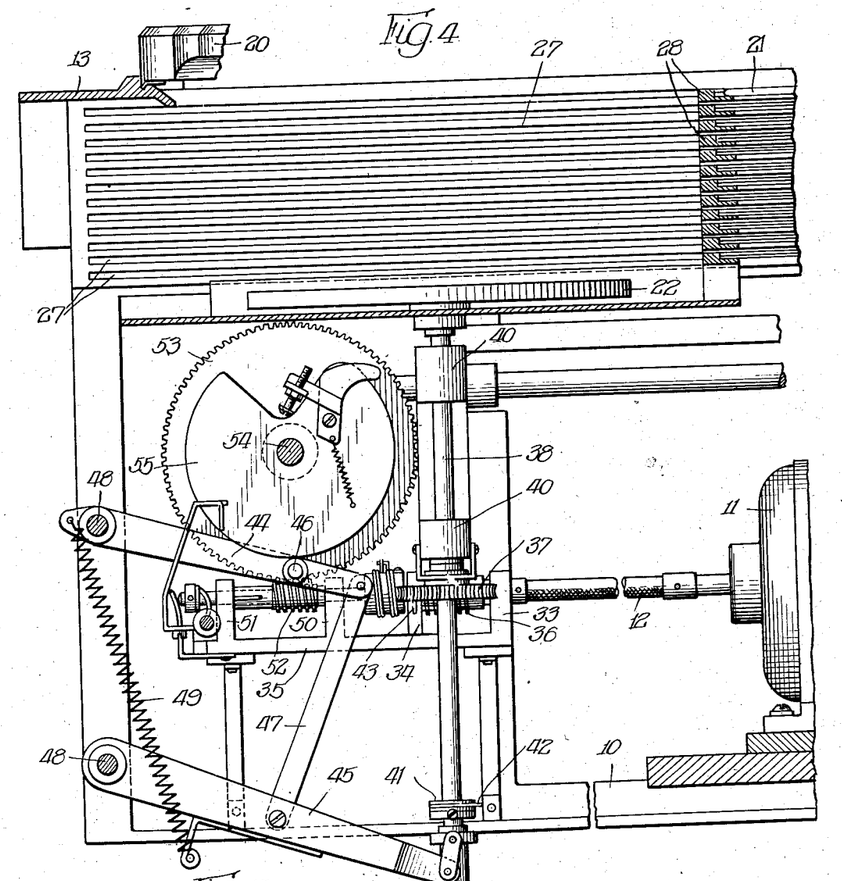
Figure 4 is a vertical sectional view taken through the phonograph showing the turntable and means for elevating same.

The inside surface of each wall 14 and 15 is formed to provide a plurality of horizontally disposed grooves 27, Figure 4, for receiving the record holding carriers 28 which are thereby mounted for horizontal reciprocating movement from the right hand end of the frame, Figure 2, where the carriers are positioned in stacked relation to the left hand end of the frame, in which position the carriers will be located over the turntable 22 so that the record disc may be engaged thereby and brought into contact with the sound reproducer 20. Each carrier supports a record disc and also each carrier is provided with a lug 29 (not shown) which extends through its respective horizontal slot 30 formed in the side wall 15 parallel to and paired with the grooves 27.

The flexible driving shaft 12 is journalled in supports 33 and 34 integral with bracket 35 which is an integral part of the side wall 14. Fixed to shaft 12, adjacent support 33 is a worm gear 36 having meshing engagement with gear 37 rotatable on standard 38 supporting the turntable 22. Standard 38 is journaled for rotation by means of brackets 40, the lower bracket also supporting gear 37. A clutch collar 41 is fixedly secured to the lower end of the standard and has a few turns of wire thereon to provide the projecting pin 42, which is adapted to engage with a pin 43 depending from gear 37, when the turntable is raised, thereby rotating the turntable through said gearing. Bodily movement vertically is imparted to the standard and thus the turntable by arms 44 and 45, the former carrying a roller 46 and pivotally connecting with arm 45 by link 47. The arms are respectively pivoted at 48 and are yieldingly biased in an upward direction by the coil spring 49. The bifurcated end of arm 45 has universal connection with the lower end of standard 38 and thus said standard can be elevated and lowered and also rotated when in elevated position.

The supports 50 and 51 journal a worm gear 52 having meshing engagement wtih gear 53, fixed to the operating shaft 54. Also fixed to this shaft is a cam 55, the periphery of which has contact with roller 46, and accordingly, said cam controls the raising and lowering movement of the turntable. The worm gear 52 is operatively connected with the driving shaft 12 by structure which forms no part of the present invention and which is therefore not described in detail. However, it is believed obvious from the showing of Figure 4 that when said worm gear 52 is rotated the operating shaft 54 accomplishes a raising and lowering of the turntable.

The operating shaft is journalled in the front and rear walls 14 and 15 and in addition to carrying the gear 53 and cam 55 there is secured to the front projecting end of said shaft an arm 56, Figure 2, having a lost motion connection with link 57, which in turn is pivotally secured at 58 with the reciprocating carriage 60. Said carriage is provided with a plurality of resilient members 61 which may be depressed by the selector pins 62 to thereby couple a particular record carrier to said reciprocating carriage. Accordingly, when the operating shaft 54 is rotated the reciprocating carriage will be moved from a position adjacent the magazine in a direction toward the left to thereby position the carrier over the turntable. The reciprocating carriage is properly positioned by the left hand stop 63 to accurately locate the record carrier over the turntable so that upon elevating movement of the turntable the record will be picked up and moved into contact with the reproducer.

The phonograph mechanism shown in Figures 1 to 4 inclusive and above described comprises the subject matter of our prior Patent No. 2,243,698 granted March 27, 1941 and a more adequate disclosure will be found in said patent.

Selector means

Figure 3:
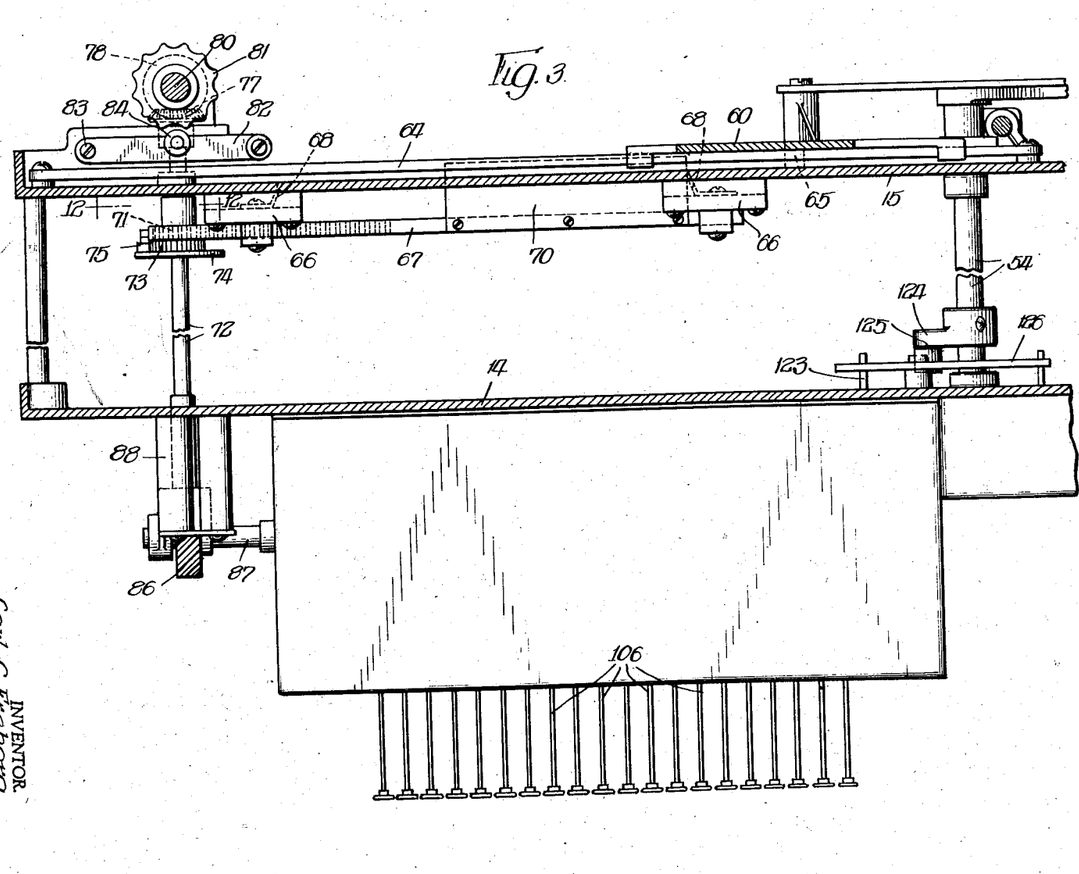
Figure 3 is a horizontal sectional view taken through the phonograph showing the selector and its association with phonograph structure and with the present selecting mechanism.

The reciprocating carriage 60 is mounted for movement on the guide rod 64 and projecting inwardly from said carriage is a roller 65, Figures 2 and 3. As best shown in said latter figure, guide 64 for the reciprocating carriage is fixed to and supported by the wall 15 of the phonograph and on the inside surface of said wall there is suitably secured members 66 which support the rack 67 for reciprocating movement in a horizontal plane substantially parallel to that of the carriage. The stops 68 limit movement of the rack since the resilient members 70 are adapted to engage therewith, a member, as shown in Figure 2, being secured to the top and bottom surface of said rack and providing a restricted passage. The members are positioned in the path of the roller 65 which, when moved upon reciprocation of the carriage, will ride within the spaced resilient members 70 and by reason of the restricted passage, reciprocating movement in the same direction will be imparted to the rack. However, when the members 70 contact one of the stops 68 further movement of the rack is prevented and the roller thereupon passes through the resilient members so that the reciprocating carriage is not prevented from reciprocating its full permissible distance.

Figures 6, 13:
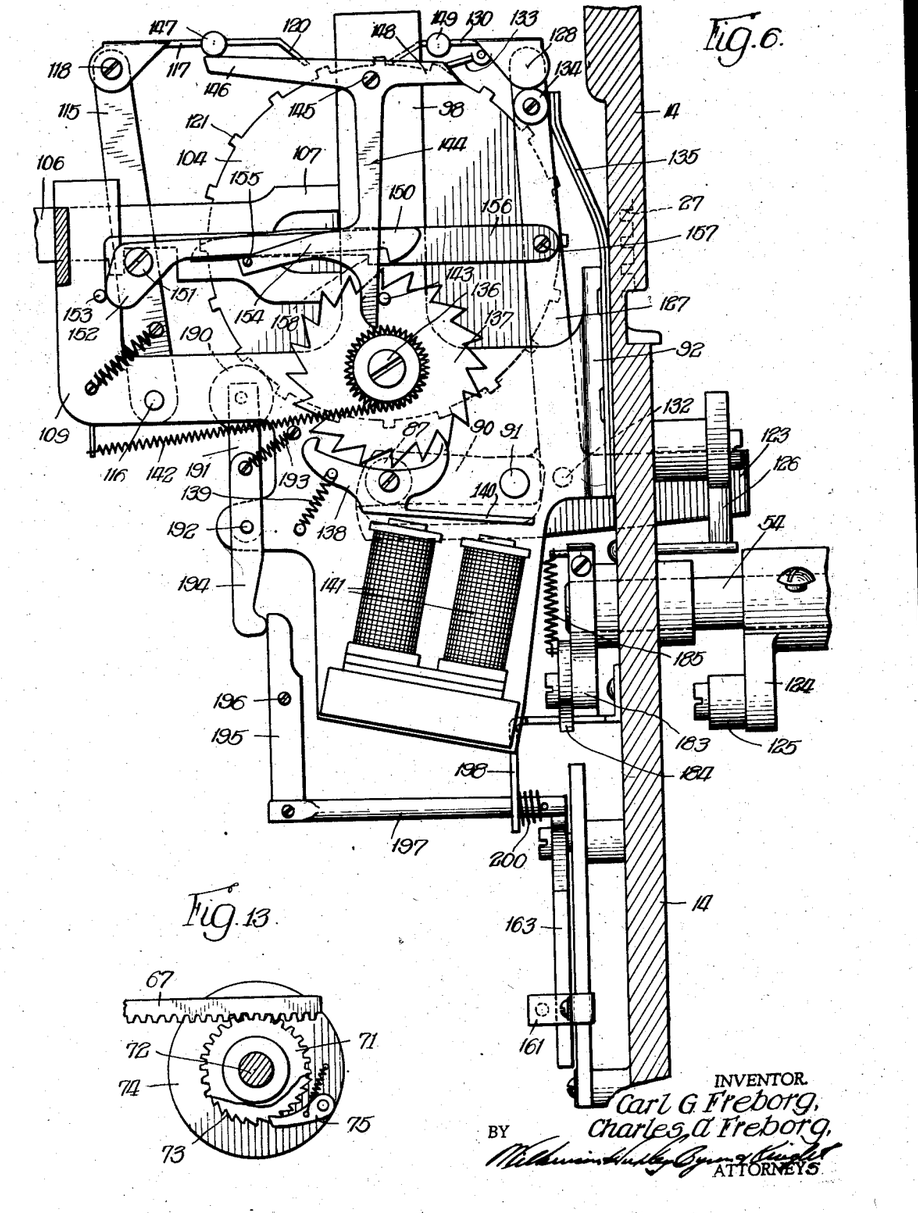
Figure 6 is an elevational view of one end of the present selecting mechanism showing the latching means therefor and associated structure.
Figure 13 is a sectional view showing in detail the driving gear for the selector and its ratchet means.

Rack 67 has meshing engagement with the driving gear 71, Figure 13, free to rotate on the shaft 72, which is journalled in the side frames 14 and 15 of the phonograph. Formed integral with said gear is a ratchet 73 but fixed to shaft 72 is a disc 74 carrying a pawl 75 and which has contact with the teeth of said ratchet. As a result of the pawl and ratchet connection between the driving gear 71 and shaft 72 the shaft is rotated only upon reciprocating movement of rack 67 in a direction toward the right, Figure 13, whereby said shaft has clockwise rotation. Said shaft extends through rear wall 15, being journalled in bracket 76, depending from said wall and has fixed to its extending end the bevel gear 77. Said gear meshes with a similar bevel gear 78 fixed to selector rod 80 and which rod is thus rotated by rack 67. The selector pins 82 are equal in length but are displaced angularly on said selector rod 80. The spoke formation of the pin conforms to a star-shaped wheel 81, Figure 3, which is also fixed to the selector rod and is provided with depressions corresponding to the number of pins on the rod. A lever 82 pivoted at 83 carries a roller 84 which is cammed into a depression in the wheel when the free end of the lever is forced by the reciprocating carriage in an outward direction. In this manner the selector rod is locked in the position desired and the rod is held locked as long as the carriage remains adjacent the magazine.

The end of shaft 72, extending beyond the front wall 14 of the phonograph, carries a gear 85 having meshing engagement with gear 86 fixed to shaft 87, forming part of the present selecting mechanism. The bracket 88 extending outwardly from the front wall 15 journals the extending end of shaft 72 and also the associated end of shaft 87. Shaft 87 is controlled by the selecting mechanism to be more particularly described and as a result of said control the extent of rotation of shaft 72 is determined for each selecting operation. Since said shaft in turn rotates the selector rod the said rod is accordingly positioned and the selected record carrier is thereby coupled to the reciprocating carriage.

Selecting mechanism

Figures 5, 14:
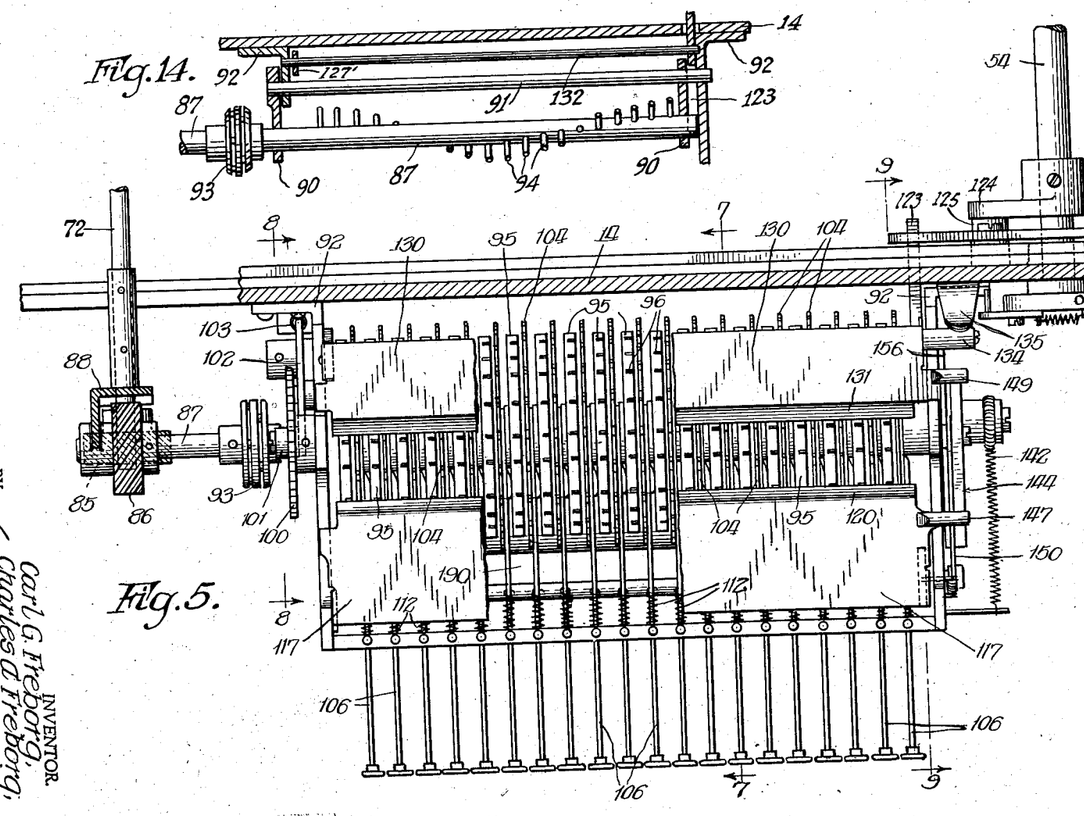
Figure 5 is a plan view of the improved selecting mechanism of the invention.
Figure 14 is a plan view, parts being shown in section illustrating the spiral arrangement of the fingers on their supporting shaft.
Figures 8, 11, 12:
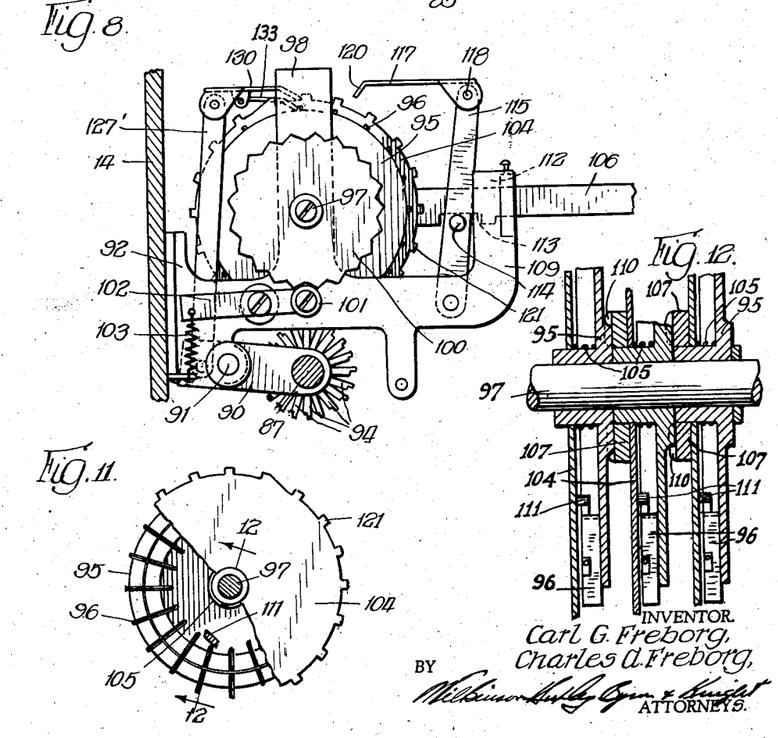
Figure 8 is a sectional view taken along line 8—8 of Figure 5.
Figure 11 is a detail view, parts being shown in section, of one element of the selecting mechanism having associated therewith its respective cam plate.
Figure 12 is a sectional view taken substantially along line 12—12 of Figure 11.

The shaft 87 is suitably journalled for rotation in a frame formed by the spaced arms 90, which are fixed to rod 91, journalled in the supporting brackets 92. Arms 90 are adapted to have rocking movement for purposes to be presently described, and accordingly, there is interposed in shaft 87 the universal joint 93 of any suitable construction which permits bodily movement of that portion of shaft 87 between the arms 90, while insuring rotation of said shaft, which is imparted thereto by shaft 72. Shaft 87 carries a plurality of fingers 94 radially disposed about the axis of said shaft and which are angularly displaced with respect to each other so that said fingers in effect form a spiral Figure 14. Positioned above the spirally disposed fingers 94 are a plurality of elements 95, there being one element for each finger, and the total number of elements is determined by the number of record carriers in the phonograph. Each element is in the form of a drum and carries a plurality of radially disposed projectable pins 96, Figure 11, which are adapted to be located in the path of its particular finger 94 to form an abutment limiting the rotation of shaft 87 and thus controlling the extent of rotation of shaft 72 and the selector of the phonograph rotated thereby. The elements 95 are fixed to shaft 97, the ends of which are journalled in upstanding portions 98 of the supporting brackets 92, suitably secured by screws to the front frame member 14 of the phonograph. On the left end of said shaft, Figure 8, is suitably secured the notched wheel 100, which determines the indexing rotation of the elements 95 since the roller 101, secured to the end of the pivoted lever 102, is yieldingly urged into contact with said wheel by the spring 103. Journalled so as to freely rotate on hubs of the elements 95 are a plurality of cam plates 104. A cam plate is associated with each element and is normally maintained in inoperative association with respect to said element by means of a spring 105 interposed therebetween.

Figure 7:
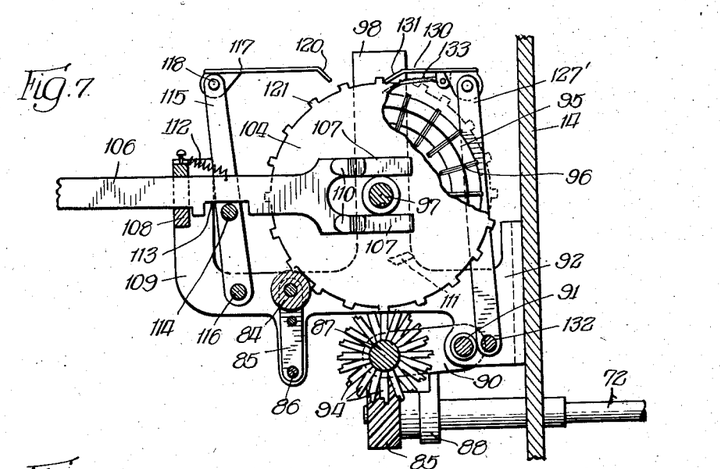
Figure 7 is a sectional view taken substantially along line 7—7 of Figure 5.

The push rods 106 are bifurcated at their inward ends, providing spaced arms 107, Figure 7, which straddle the hub of its particular element 95 and which therefore supports this end of the push rod for reciprocating movement. The forward end is likewise mounted for similar movement in the cross piece 108 supported at its respective ends by portions 109 of the brackets 92. Each arm 107 of each push rod is provided with a cam portion 110 which, as shown in Figure 12, has a thickness greater than the space between an inoperatively positioned cam plate and the next adjacent element whereby upon reciprocating movement of the push rod its respective cam plate 104 will be directed axially toward its element 95 into operative relation therewith. Each cam plate is provided with a cam 111 located on the inside surface of said plate toward its respective element and which is adapted to contact the pins 96 and force said pins outwardly into a projected position when the cam plate is rotated. The rotation of the cam plates takes place in unison so that the cams 111 are stepped around in unison. This rotation is effected as a result of a selecting operation and is accomplished by the push rods 106. Each rod is yieldingly held by the spring 112 in its outermost position where the cam portions will be inoperative and accordingly, all the cam plates will be spaced from their respective elements. In this spaced relation of the cam plates with their elements each cam 111 is out of alignment with its respective pins 96 and accordingly said pins are not projected in the event rotation of the cam plate takes place. It is first necessary to force the cam plate axially inwardly so as to locate the cam 111 in alignment with the pins 96 and this operation is accomplished as a result of the cam portions 110 when the push rods are reciprocated inwardly. Each rod is formed with a recess 113 on its under side within which is located a bar 114 having each end supported by an arm 115. The bar therefore extends between arms 115, each arm being pivoted at its lower end as at 116 to portions 109 of the supports. The upper ends of the arms 115 have connection with a plate member 117, said member being pivotally secured to the respective arms at 118 and having a downwardly directed edge 120 for engaging the projections 121, formed in spaced relation on the periphery of each of the cam plates 104.

When the plate member 117 is operative for performing an indexing rotation of the cam plates it will be seen that movement thereof will take place toward the end of the stroke of a push rod and accordingly the particular cam plate corresponding to said push rod will have been positioned inwardly toward its element. Further inward movement of the rod and thus oscillation of the arms 115 will produce movement of the plate member 117 so that its depending edge 120 will engage with one of the projections 121 on each of the cam plates and therefore as a result of a selecting operation all of the cam plates have an indexing rotation. However, only one cam plate was operative to cause a pin 96 to project from an element, and assuming that cam 111 was initially positioned as shown in Figure 7, it will be seen that the pin projected as a result of the first selecting operation depends vertically downward from its respective element and is therefore in the path of the finger 94 corresponding to said element. Another selecting operation may result in the reciprocation of the same push rod or another rod. In any event, its respective cam plate will be forced toward its element and following this axial movement of the cam plate, all the cam plates will have an indexing rotation as a result of reciprocating movement of the plate member 117. As the selecting operations continue it will be noted that the cams 111 of the cam plates are stepped around in unison. The first pin to be projected from an element was stated as depending vertically and was thus directly in the path of finger 96 corresponding to said element. However, the next pin to be projected from a selected element will be angularly displaced with respect to the vertical by an angle equal to the indexing rotation of the cam plates. The same follows for each selecting operation. In other words, the third selection will cause a pin to project from an element which will be angularly displaced from the vertical equal to two indexing rotations of the cam plates. In the present embodiment the total number of units in the group for selection equals twenty, and thus there are twenty elements, twenty of the spirally disposed fingers 94 and twenty cam plates. This number likewise determines the projections 121 on each cam plate and since there are twenty of these projections, each indexing rotation is equal to eighteen degrees. Thus the second pin projected from an element is displaced from the vertical eighteen degrees. The third pin is displaced thirty-six degrees and so on.

It will be assumed that a record has been played by the phonograph corresponding to the first pin which, as above described, was projected vertically downward. Through the operation of the phonograph the shaft 87 is given bodily movement in an upward direction and since a finger is in engagement with said projecting pin, the said pin will be depressed or returned to its initial position, where it is substantially flush with the periphery of its element. As previously described, the shaft 87 was stated as carried in spaced arms 90 pivotally supported from brackets 92 at 91. The said shaft is rocked by an inverted T-shaped lever 122, Figure 9, the horizontally disposed leg 123 of which is in contact with said shaft. The operating shaft 54 carries a crank 124 having a roller 125 which has contact with the underside of the right hand end of arm 126 pivoted to stud 126′, Figure 9, thereby causing downward movement of the left hand end of said arm and rocking the T-shaped lever 122, since said end of the arm overlies the projecting end of said lever.

Figure 9:
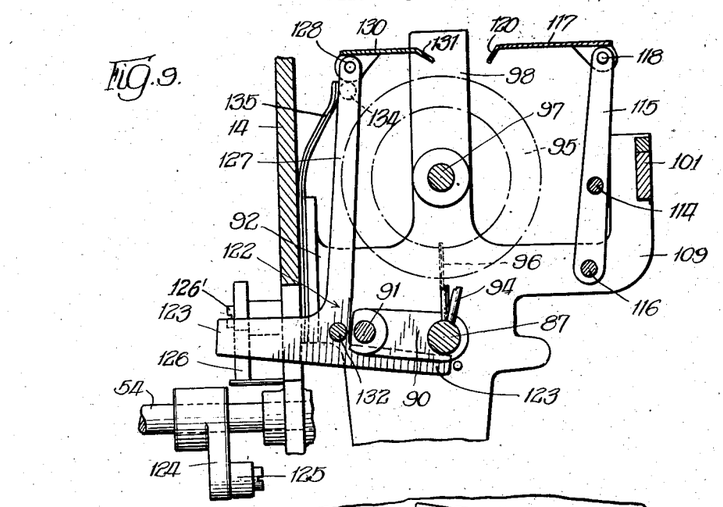
Figure 9 is a sectional view taken substantially along line 9—9 of Figure 5, and illustrating the means for returning a projecting pin to depressed position following the playing of a record.

In addition to causing upward movement of the spirally disposed fingers 94 for depressing a projecting pin 96 the lever 122 likewise accomplishes another function, namely, to cause indexing rotation of the elements and retrograde rotation of the cam plates so that when all the selected records have been played the cam plates will be initially positioned. As best shown in Figures 7 and 9, the vertical leg 127 of the inverted T-shaped lever 122 has pivotally connected to its upper end as at 128 an indexing plate 130 having an inwardly directed forward edge 131 by which retrograde movement is imparted to the cam plates. Movement of lever 122 is imparted to its pivot shaft 132 journalled in supporting brackets 92 and which has secured to its other end an upstanding leg 127′. The said legs and shaft 132 together form a movable frame and which carries the indexing plate 130. Pivotally supported from the underside of plate 130 is a pawl 133, the forward edge of which is in contact with the periphery of one of the elements 95. This pawl accomplished the indexing rotation of said elements since the pawl engages with the pins 96, which, although in depressed position, will extend a sufficient distance from the periphery to render said pawl operative.

Fixedly secured to and projecting from leg 127 is a roller 134 which is in contact with the flat spring 135, suitably secured to the frame of the phonograph. The function of spring 135 is to yieldingly hold the frame carrying the indexing plate 130 in a forward position and which accordingly maintains the horizontally disposed leg 123 in a position where it is out of contact with shaft 87 carrying the spirally disposed fingers. In the operation of rocking lever 122 to cause bodily movement of shaft 87 and said fingers for depressing a pin, it will be observed that leg 127 is moved against the tension of spring 135. This movement imparts rearward reciprocation to the indexing plate 130 and as a result its forward end 131 will be located back of a projection 121 on each of the cam plates. Likewise the pawl 133 will be located in back of a pin 96 and when forward reciprocation of the plate 130 takes place, due to tension exerted by spring 135 in this direction, indexing rotation of the elements will result and retrograde movement of the cam plates, this latter movement being equal to that of the indexing rotation or eighteen degrees for the embodiment disclosed.

In view of the foregoing, it will be understood that through actuation of the cam shaft 54 of the phonograph the vertically disposed pin which was projected as a result of the first selecting operation will be depressed or returned to initial position following the playing of the record corresponding thereto and automatically an indexing of the elements will take place to bring the next projected pin into a vertical position where it will be disposed in the path of a finger 94. Simultaneously with this indexing of the elements the cam plates have imparted thereto a reverse indexing rotation, the result of which is to locate the cam plates in their initial position when all the selected records have been played. For example, in the event three selections are made, the cam plates will have been rotated a distance equal to three indexing rotations. The indexing plate 130 is reciprocated following each playing of the record to impart reverse rotation to the cam plates, which is equal in magnitude to that of the indexing rotation and thus after the third record has been played the reverse rotation given to the cam plates will locate them in initial position where the cams 111 will be in position as shown in Figure 7.

Latching means

The present selecting mechanism is normally rendered inoperative for selecting purposes. However, with the insertion of a coin in the phonograph the means holding the selecting mechanism inoperative is automatically released. This mechanism will now be described.

Referring to Figure 6, one of the supporting brackets 92 rotatably supports through stud 136 a ratchet wheel 137 having associated therewith escapement mechanism 138, tensioned by spring 139. Integral with the escapement mechanism is an armature 140 which may be attracted against the tension of the spring 139 in a downward direction by the electro-magnets 141. These magnets are electrically connected with similar magnets forming part of the coin controlled means (Figure 15) and upon the dropping of a coin in the phonograph both sets of magnets are energized to attract their armatures and in the case of the escapement mechanism 138, the same will be oscillated to allow clockwise rotation of the ratchet wheel 137 to take place. The ratchet wheel is yieldingly biased in this direction by coil spring 142. The rotation, however, will be limited by the escapement mechanism to one notch, which will move the pin 143 out of contact with the latching lever 144 pivotally supported from portion 98 by the pin 145. Leg 146 of said latching mechanism is normally in contact with the extending portion 147, projecting from the right hand side of the plate member 117 and results in elevating said plate member to the extent where reciprocating movement of the same does not produce rotation of the cam plates. However, upon release of the latching lever 144 the leg 146 will drop and the plate member will thereupon be operative so that a selection can be made by the operator through actuation inwardly of one of the push rods 106. This release of the latching lever elevates the leg 148 of said lever, which in turn contacts the portion 149 extending from one side of the indexing plate 130 to thereby elevate said plate. The downwardly extending edge of said plate is accordingly lifted from its position to the rear of the projections 121 on the cam plates to thereby permit an indexing rotation of said cam plates. Therefore, as a result of the latching lever the plate member 117 is normally held inoperative and the indexing plate 130 is rendered operative to the extent where it prevents an indexing rotation of the cam plates.

Rotation of the ratchet wheel 137 one notch is all that is necessary to release the latching lever 144. However, more than one coin will sometimes be deposited and in this event the ratchet wheel is rotated another notch for each coin, assuming, of course, that the coins are of the unit denomination required for the phonograph. The coin controlled mechanism is of conventional construction and is generally designed to operate on a nickel as the coin of minimum requirement for which one record is played. If a coin of the denomination of ten cents or twenty-five cents is deposited rotation of wheel 137 will take place for two or three notches, depending on the denomination of the coin. This is effected through energization of magnets 141 which attract the armature 140 and move the escapement 138 so as to allow rotation of wheel 137 one notch for each movement of the armature.

For returning the ratchet wheel to its initial latching position following the selections permitted by the coins deposited, the invention provides a pawl 150 pivotally secured at 151 to an upright arm 115. When the arm 115 is positioned as shown in Figure 6 the bulbous portion 152, extending rearwardly of the pawl, will contact a pin 153 and as a result the forward end of the pawl is held in raised position where it will clear the ratchet wheel. The latching lever has an extension 154 carrying pin 155 which likewise supports the pawl 150, holding said pawl in raised position. However, upon release of the latching lever the pin 155 will drop and during released position of said lever the pin will be properly located to form a support for the pawl. When a selecting operation is performed it will be understood that the pawl is moved forwardly in a direction toward the right, Figure 6, the result of which will be to allow the free end of said pawl to drop downwardly into contact with a tooth on the ratchet wheel. Movement of the pawl in a direction toward the left therefore rotates the wheel in a reverse direction from that permitted by its escapement mechanism and eventually the pin 143 will be brought into contact with the latching lever, locating the same in a latching position where the selecting mechanism is rendered inoperative for selecting purposes.

As a result of the above, the selecting mechanism of the invention is rendered operative automatically with the insertion of a coin in the phonograph and which is operative to the extent where the number of selections that can be made will be determined by the number of coins deposited, their denomination or both, and which will equal in number the records to be played. Assuming that ten cents has been deposited, as above described, this will cause rotation of the ratchet wheel two notches. The latching means will be released and the operator may then make his selections. As a result of the first selection the pawl will be brought into engagement with a ratchet or tooth on the wheel and by rearward movement of said pawl the wheel will be rotated one notch in a reverse direction. The same operation is repeated following the next selection and accordingly the pin 143 will be again caused to contact the latching lever, moving the same into latching position.

The invention also contemplates means whereby the selecting mechanism will be rendered inoperative for selecting purposes following the playing of all the selected records in the event the operator does not complete the selections permitted by the coin or coins deposited in the machine. Means for accomplishing the above consists of a pawl arm 156 pivotally connected at 157 to leg 127 of the lever 122. This leg has reciprocating movement similar to that imparted to upright arm 115 but the movement of said leg follows the playing of a record. The pawl arm 156 is therefore reciprocated and when the leg 127 is oscillated against the tension of spring 135 the shoulder 158, formed on said pawl arm, will be caused to engage with a tooth of the ratchet wheel. Upon return movement of the leg the pawl arm will be operative to perform the above function. If the latching lever is located in its latching position then the pin 155 will hold the pawl arm 156 in a raised position where it will not be able to engage with a tooth on the ratchet wheel. However, in the event the latching lever is not located in its latching position, and this will be the case if the operator has not made all the selections permitted by the coin or coins deposited, then pin 155 will be located in its lower position, allowing the pawl arm to assume a position whereby the same will be caused to engage with a tooth on the ratchet wheel.

Coin controlled mechanism

Figure 10:
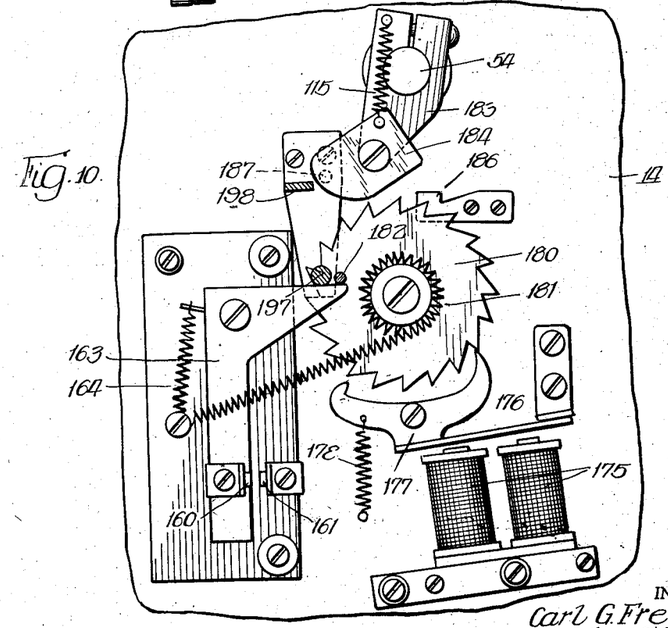
Figure 10 is an elevational view, some of the parts being shown in section, of the coin controlled means which determines the number of records to be played.
Figure 15:
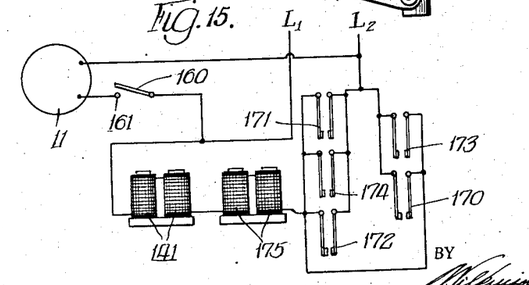
Figure 15 is a wiring diagram showing the electrical connections for the electric motor of the phonograph, the electromagnets and the contacts forming part of the coin control mechanism.

The circuit to the electric motor 11 includes the switch consisting of contacts 160 and 161, Figures 10 and 15, the former being secured to the lower end of the pivoted lever 163 which is resiliently urged in a direction to cause closing of the contacts by the coil spring 164. The contacts are normally held separated but are allowed to engage to close the circuit and energize the motor upon the insertion of a suitable coin in the coin chute, as shown in Figure 1. The same comprises three passageways 165, 166 and 167 adapted to receive a nickel, dime and a quarter, respectively. The passageway 165 has a throw-out pawl 168 which ejects from said passageway a penny or dime, if the operator should inadvertently drop such a coin in this chute. In the lower portion of the passageway there is positioned an electric contact 170 which is tripped by the travel therethrough of a nickel. The passageway 166 is provided with two electric contacts 171 and 172 and both are tripped as a result of the travel through this passageway of a dime. The three contacts described and two additional contacts, namely, 173 and 174, are associated with the passageway 167 adapted to receive a quarter and which will have a zig-zag course whereby the quarter will trip all five contacts. As shown in the wiring diagram, Figure 15, said contacts are each connected with electro-magnets 175 and also with the electro-magnets 141 described in connection with the latching means.

As best shown in Figure 10 the magnets 175 are provided with an armature 176 forming part of the escapement mechanism 177 yieldingly biased in one direction by the coil spring 178. The escapement mechanism is associated with a ratchet wheel 180 rotatably mounted on the outside surface of the front wall 14. The coil spring 181 yieldingly forces the ratchet wheel to rotate in a clockwise direction and therefore the escapement mechanism normally holds the wheel locked against rotation in this direction. The ratchet wheel carries a pin 182 adapted to engage the projecting end of the pivoted lever 163, carrying contact 160, and when in engagement with said lever, as shown in Figure 10, the contacts 160 and 161 will be separated. Upon energization of the electro-magnets 175 by the coin or coins as described, the armature 176 will be attracted to actuate the escapement mechanism, allowing the ratchet wheel to rotate clockwise one notch. A similar energization of the magnets will rotate the ratchet wheel another notch. Such rotation will release pin 182 from contact with the pivoted lever 163 and thus said pivoted lever will be free to move in a direction to close the contacts. However, the invention provides another locking pin for the contacts under control of the selecting mechanism, as will be presently described.

It is necessary that the ratchet wheel 180 be returned one notch following the playing of a record so that when all the records, permitted by the coin or coins deposited, have been played, the contacts will be separated to stop further operation of the phonograph. This consists of an arm 183 secured to the projecting end of the operating shaft 54 and which carries the pivoted pawl 184 held in outwardly projecting position by the coil spring 185. Fixed to the frame 14 is a latch 186 which provides a releasable stop for the pawl 184 since the pin 187, fixed to said pawl and projecting inwardly, is adapted to contact the same. However, the pawl is only momentarily held since continued rotation of the operating shaft will cause release of the pawl 184. However, due to this holding of the pivoted pawl while the operating shaft is rotating, said pawl is spring energized and upon release the same has quick rotation in a clockwise direction, causing the pin 187 to engage a notch in the ratchet wheel and rotate the wheel for a distance equalling one notch. As stated, when the proper number of records have been played the ratchet wheel will thereby be returned to its initial position, bringing pin 182 into engagement with lever 163 and separating the contacts so that the phonograph comes to rest.

Except for the improvements of the invention, the contacts 160 and 161 would engage following the insertion of a coin to start operation of the phonograph. This, however, would not give the operator a chance to make his selection or selections on the mechanism provided therefor, and accordingly, further means are provided holding the contacts separated until the first selection has been made. The roller 190, Figure 6, is carried by spaced arms 191 pivotally supported by shaft 192. The roller is tensioned and held in contact with the cam plates by spring 193. The dog 194, fixed to shaft 192 and forming part of the above described roller structure, will have oscillating movement as said roller is cammed outwardly by reason of the projections 121 which must pass by said roller. Said dog is maintained in contact with lever 195 pivoted at 196 and having connection at its lower end with rod 197. Said rod is supported at its inwardly directed end by bracket 198 and is yieldingly biased by spring 200 in an inward direction toward the front wall 14 of the phonograph. When the rod projects its full distance in this inward direction the end of the same is located over pivoted lever 163 and thus said rod in addition to the pin 182 operates to hold the contacts separated, in which position thereof the motor of the phonograph is at rest. As explained, the coin control mechanism following insertion of a coin will release pin 182 from the pivoted lever 163 and immediately upon a selection being made by the operator, the roller 190 will be rocked, which will impart to rod 197 movement in a direction outwardly to withdraw the rod from contact with pivoted lever 163. This allows the contacts to engage and the phonograph will begin operation and the record played will be that record selected by the first actuation of the selecting mechanism.

*Operation of the phonograph*

For making a selection a push rod corresponding to the record desired is moved inwardly to operatively associate its cam plate with the element positioned adjacent thereto. Actuation of the push rod imparts movement to the plate member 117 and this member is operative to cause an indexing rotation of the cam plates, which are free to rotate on the shaft 97. However, the cam plate selected is the only one which is operative to cause a pin to project from its element and this projected pin will extend vertically downward. The dropping of a coin in the machine energized both sets of magnets, the electromagnets 141 allowing clockwise rotation of ratchet wheel 137 to take place for one notch only, which is sufficient to free the plate member so that one selection could be made. Energization of electro-magnets 175 allows the ratchet wheel 180 to also rotate one notch so that the phonograph may be operated to play one record.

However, the above selecting operation was necessary to start operation of the phonograph and accordingly shaft 54 will rotate a complete revolution and the following operations will take place in sequence. It must first be pointed out that when the phonograph is at rest the turntable assumes its lowermost position and the record carrier with a record disc thereon is located directly over the same. In other words, the last record played is out of position as regards the magazine. The operating shaft must therefore first return this record carrier and as the reciprocating carriage travels toward the magazine to accomplish this result the roller 65 will contact the spaced resilient members 70 and reciprocating movement will be imparted to the rack. Automatically therewith shaft 72 will be rotated, the selector rod will be rotated, and shaft 87 of the selecting mechanism will likewise have rotation therewith. This latter shaft carries the spiralling fingers 94 and rotation of the same will continue until a particular finger contacts the vertically projecting pin on the selected element. The mechanism in this manner controls the selector rod and it will be understood that said rod will be positioned so that a selector pin 82 will be directed into contact with a resilient member 61 of the carriage to effect coupling of the proper record carrier to said carriage. Although reciprocation of the rack is thus prevented by the selecting mechanism, movement of the carriage toward the magazine continues since the roller merely rides through the resilient member 70. The carriage is caused to release the carrier returned thereby and automatically the selected record carrier will be coupled thereto. Continued rotation of the operating shaft is effective to locate the selected record carrier over the turntable and when this has taken place the turntable is elevated, bringing the record into contact with the reproducer. The operating shaft, as a result of structure which forms no part of the present invention, is thereupon disconnected from its driving shaft 12 and the turntable is held in raised position during the playing of the record.

During movement of the selected record carrier to its position over the turntable the operating shaft will cause the roller 125, carried by crank 124, to contact the underside of the right hand end of the pivoted arm 126, Figure 3, to rock the T-shaped lever 122. This accomplishes two functions. Shaft 87 is bodily moved upwardly to depress the projecting pin which was in contact with a finger 94 of said shaft. The rocking of the lever 122 to cause bodily upward movement of shaft 87 imparts rearward movement to the indexing plate 130 and as rotation of the operating shaft continues the lever 122 will have movement under the tension of spring 135 forwardly to its initial position, thereby moving the indexing plate forwardly to accomplish an indexing rotation of the elements and retrograde movement of the cam plates. This rotation of the elements will bring another projecting pin into vertically depending position if more than one selection has been made and will also return said cam plates so that the cams 111 thereof will eventually be located as shown in Figure 7. In this position of the cam plates it will be observed that a selecting operation will cause the first pin to be projected vertically downward. Following the playing of the selected record the pawl 184, which is spring energized, due to rotation of the operating shaft, will contact ratchet wheel 180, rotating the same counterclockwise for one notch. However, since only one coin of unit denomination was deposited this will bring the pin 182 into engagement with the contact lever 163, separating the contacts and the phonograph comes to rest.

If more than one coin had been deposited in the phonograph or in the event a coin of larger denomination than the unit required for operating the phonograph had been deposited, the mechanism above described would have permitted the playing of more than one record. In this event operation of the phonograph begins following the first selection and during the sequential operations of the phonograph for playing the first selected record the operator will have an opportunity to make additional selections up to the number permitted by the particular coin deposited. When all the selections have been made the mechanism will be rendered inoperative for further selecting purposes and will only become operative again by insertion of another coin or coins in the machine. Also the mechanism is so constructed that in the event the operator does not make all the selections permitted, nevertheless, the mechanism will be rendered inoperative for selecting purposes following the playing of the last selected record.

The structure of the present invention is not necessarily limited in application to phonograph machines although for purposes of illustration said machine was preferred. The elements of the selecting mechanism equal in number the units of the group, or in other words, the record carriers and also the radially movable pins on the elements likewise equal in number the units in the group. By selecting a particular element this will in turn result in selecting a unit from the group corresponding thereto. However, for a plurality of selections the projecting pins determine the order of playing and which is in exact sequence according to the selection.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. Selecting mechanism for selecting one or more units from a group such as certain records in a multiple record phonograph, including a plurality of elements equal in number to the units in the group, a plurality of pins carried by each element and projectable from the periphery thereof, movable means for each element for actuating the pins thereof to cause said pins to be projected in sequence, said movable means being normally inoperatively associated with its element, and means adapted to be actuated by the operator for positioning a particular movable means in operative association and to cause movement thereof.

2. Selecting mechanism for selecting one or more units from a group such as certain records in a multiple record phonograph, including a plurality of elements equal in number to the units in the group, a plurality of pins carried by each element and projectable from the periphery thereof, a movable cam plate normally inoperatively associated with each element, each cam plate when operatively positioned and moved causing said pins to project from its element in sequence, and actuating means for each cam plate, said means being constructed and arranged so that when the operator actuates the same the cam plate is first operatively positioned and then moved.

3. Selecting mechanism for selecting one or more units from a group such as certain records in a multiple record phonograph, including a plurality of elements equal in number to the units in the group, a plurality of pins carried by each element and projectable from the periphery thereof, a movable cam plate normally inoperatively associated with each element, each cam plate when operatively positioned and moved causing said pins to project from its element in sequence, a lever for each cam plate for operatively positioning a cam plate with respect to its element when actuated, and means for moving all said cam plates in unison when any one lever is actuated.

4. Selecting mechanism for selecting one or more units from a group such as certain records in a multiple record phonograph, including a plurality of elements equal in number to the units in the group, a plurality of pins carried by each element and projectable from the periphery thereof, a movable cam plate normally inoperatively associated with each element, each cam plate when operatively positioned and moved causing said pins to project from its element in sequence, a reciprocable lever for each cam plate for operatively positioning a cam plate with respect to its element when actuated, and other means having operation to move all said cam plates in unison and of equal magnitude when any one lever is reciprocated.

5. Selecting mechanism for selecting one or more units from a group such as certain records in a multiple record phonograph, including a plurality of elements equal in number to the units in the group, a plurality of pins carried by each element and projectable from the periphery thereof, a movable cam plate normally inoperatively associated with each element, each cam plate when operatively positioned and moved causing said pins to project from its element in sequence, a reciprocable lever for each cam plate for operatively positioning a cam plate with respect to its element when reciprocated, other means having operation to move all said cam plates in unison when any one lever is reciprocated, and latching means for holding said other means in an inoperative position.

6. Selecting mechanism for selecting one or more units from a group such as certain records in a multiple record phonograph, including a plurality of rotatable elements equal in number to the units in the group, a plurality of pins carried by each element and projectable from the periphery thereof, a rotatable cam plate normally inoperatively associated with each element, each cam plate when operatively positioned and rotated causing said pins to project from its element in sequence, a lever for each cam plate for operatively positioning a cam plate with respect to its element when actuated, and means constructed and arranged to cause rotation of said cam plates in unison as a result of actuation of any one of said levers.

7. In an automatic phonograph, a plurality of record carriers, a movable turntable, selecting means for the record carriers, and selecting mechanism capable of a plurality of selections at one time governing said selecting means so that the record carriers moved in succession into position over the turntable correspond to particular selections made on said selecting mechanism, said mechanism including a plurality of elements equal in number to the record carriers, a plurality of pins carried by each element and projectable from the periphery thereof, and means operated by the phonograph following the playing of a selected record to depress said projectable pin and cause an indexing movement of said elements.

8. In an automatic phonograph, a plurality of record carriers, a movable turntable, selecting means for the record carriers, and selecting mechanism capable of a plurality of selections at one time governing said selecting means so that the record carriers moved in succession into position over the turntable correspond to particular selections made on said selecting mechanism, said mechanism including a plurality of rotatable elements equal in number to the record carriers, a plurality of pins carried by each element and projectable from the periphery thereof, means actuated by the selecting operation to cause a pin to be projected from the periphery of the selected element, and means having operation following the playing of a selected record to depress the projected pin thus returning the same to initial position and to cause an indexing rotation of the elements.

9. In an automatic phonograph, a turntable, a plurality of record carriers each movable into and from a playing position over the turntable, means for moving the carriers into and from said playing position, a selector for connecting a selected record carrier to said means, selecting mechanism capable of selecting a plurality of records at one time, said mechanism including rotatable elements equal in number to the record carriers, a plurality of radially movable pins carried by each element and projectable from the periphery thereof, manually operable means for each element for projecting a pin from the periphery of its element, and rotatable means associated with said elements and having rotation prior to the playing of each record the extent of which is determined by a projecting pin, said rotatable means controlling the operation of said selector whereby the record carriers will be selected according to the selected elements and whereby the records thereof will be played in sequence as predetermined by the pins projected from the selected elements.

10. In an automatic phonograph, a turntable, a plurality of record carriers each movable into and from a playing position over the turntable, means for moving the carriers into and from said playing position, a selector for connecting a selected record carrier to said means, selecting mechanism capable of selecting a plurality of records at one time, said mechanism including rotatable elements equal in number to the record carriers, a plurality of radially movable pins carried by each element and projectable from the periphery thereof, and means associated with said elements and having operative connection with said selector whereby the record carriers will be selected according to the selected elements.

11. In an automatic phonograph, a turnable, a plurality of record carriers each movable into and from a playing position over the turntable, means for moving the carriers into and from said playing position, a selector for connecting a selected record carrier to said means, selecting mechanism capable of selecting a plurality of records at one time, said mechanism including rotatable elements equal in number to the record carriers, a plurality of radially movable pins carried by each element and projectable from the periphery thereof, a push rod for each element for causing a pin to project from the periphery of its element when actuated, rotatable means associated with said elements and having rotation prior to the playing of each record the extent of which is determined by a projected pin, and means connecting said rotatable means with the selector whereby the record carriers will be selected according to the selected elements and whereby the records thereof will be played in sequence as predetermined by the pins projected from the selected elements.

12. In an automatic phonograph, a turntable, a plurality of record carriers each movable into and from a playing position over the turntable, means for moving the carriers into and from said playing position, a selector for connecting a selected record carrier to said means, selecting mechanism capable of selecting a plurality of records at one time, said mechanism including rotatable elements equal in number to the record carriers, a plurality of radially movable pins carried by each element and projectable from the periphery thereof, means actuated for each selecting operation for projecting a pin from the periphery of the particular selected element, the projecting pins for the selected elements following the first selection having an angular displacement with respect to the vertical which is correspondingly greater for each selecting operation, and means associated with said elements and having operative connection with said selector whereby the record carriers selected correspond to the selected elements and whereby the records thereof are played in sequence as predetermined by the pins projecting from said selected elements.

13. In an automatic phonograph, a turntable, a plurality of record carriers each movable into and from a playing position over the turntable, means for moving the carriers into and from said playing position, a selector for connecting a selected record carrier to said means, selecting mechanism capable of selecting a plurality of records at one time, said mechanism including rotatable elements equal in number to the record carriers, a plurality of radially movable pins carried by each element and projectable from the periphery thereof, means actuated for each selecting operation for projecting a pin from the periphery of the selected element, rotatable means associated with said elements and operatively connecting with said selector whereby the record carriers will be selected according to the selected elements, and means having operation following the playing of a record to depress the projecting pin on the element corresponding thereto.

14. In an automatic phonograph, a turntable, a plurality of record carriers each movable into and from a playing position over the turntable, means for moving the carriers into and from said playing position, a selector for connecting a selected record carrier to said means, selecting mechanism capable of selecting a plurality of records at one time, said mechanism including rotatable elements equal in number to the record carriers, a plurality of radially movable pins carried by each element and projectable from the periphery thereof, means actuated for each selecting operation for projecting a pin from the periphery of its selected element, rotatable means associated with said elements and having rotation prior to the playing of each record the extent of which is determined by a projected pin, said rotatable means controlling the operation of said selector whereby the record carriers will be selected according to the selected elements and whereby the records thereof will be played in sequence as predetermined by the pins projected from the selected elements, and means for depressing the projected pin corresponding to said record following the playing thereof.

15. In an automatic phonograph, a turntable, a plurality of record carriers each movable into and from a playing position over the turntable, means for moving the carriers into and from said playing position, a selector for connecting a selected record carrier to said means, selecting mechanism capable of selecting a plurality of records at one time, said mechanism including rotatable elements equal in number to the record carriers, a plurality of radially movable pins carried by each element and projectable from the periphery thereof, means actuated for each selecting operation for projecting a pin from the periphery of the selected elements, rotatable means associated with said elements and having operative connection with said selector, whereby the record carriers will be selected according to the selected elements, means having operation following the playing of a record to depress the projecting pin on the element corresponding thereto, and other means for causing indexing rotation of said elements after said projecting pin has been depressed.

16. In an automatic phonograph, a turntable, a plurality of record carriers each movable into and from a playing position over the turntable, means for moving the carriers into and from said playing position, a selector for connecting a selected record carrier to said means, selecting mechanism capable of selecting a plurality of records at one time, said mechanism including rotatable elements equal in number to the record carriers, a plurality of radially movable pins carried by each element and projectable from the periphery thereof, means for each element which when actuated project a pin from the periphery of the selected element, said means being constructed and arranged whereby the projecting pins for a plurality of selected elements will have an angular displacement with respect to each other which is equal, rotatable means associated with said elements and having rotation prior to the playing of each record the extent of which is determined by a projected pin, means connecting said rotatable means with the selector whereby the record carriers will be selected according to the selected elements, and whereby the records thereof will be played in sequence as predetermined by the pins projected from the selected elements, means for depressing the projected pin following the playing of the record corresponding thereto, and other means for causing indexing rotation of said elements after a projecting pin has been depressed.

17. In selecting mechanism for selecting one or more units from a group such as certain records in a multiple record phonograph, in combination, a plurality of rotatable elements equal in number to the units in the group, a plurality of pins carried by each element and projectable from the periphery thereof, a rotatable cam plate normally inoperatively associated with each element, each cam plate when operatively positioned and rotated having coaction with the pins of its respective element to cause said pins to project from the element in sequence, a push rod for each cam plate for operatively positioning the cam plate with respect to its element, and means constructed and arranged to cause rotation of all said cam plates in unison as a result of the actuation of any one of said push rods, said rotation being limited in extent so that only one pin is projected from the selected element, whereby for a plurality of selections the projecting pins will have an angular displacement with respect to the first projected pin which is correspondingly greater for each selecting operation.

18. In selecting mechanism for selecting one or more units from a group such as certain records in a multiple record phonograph, in combination, a plurality of rotatable elements equal in number to the units in the group, a plurality of pins carried by each element and projectable from the periphery thereof, a rotatable cam plate normally inoperatively associated with each element, each plate having a cam for projecting the pins from its element when the plate is operatively positioned and rotated, a push rod for each cam plate, each push rod when reciprocated operatively positioning a plate with respect to its element, and means constructed and arranged to cause rotation of said cam plates in unison as a result of the reciprocation of any one of said push rods, said rotation being limited in extent so that only one pin is projected from the selected element, whereby for a plurality of selections the projecting pins will have an angular displacement with respect to the first projected pin which is correspondingly greater for each selecting operation.

19. In selecting mechanism for selecting one or more units from a group such as certain records in a multiple record phonograph, in combination, a plurality of elements each having a plurality of radially movable pins spaced around and projectable from the periphery thereof, a rotatable shaft having said elements fixed thereto with the pins in alignment, cam plates freely rotatable on said shaft and having association with an element respectively, means positioned between each element and its cam plate holding said plate inoperative with respect thereto, a push rod for each cam plate for operatively positioning the plate with respect to its element, each plate having means thereon whereby upon rotation of the plate the pins will be projected from its element in sequence, and means constructed and arranged to cause rotation of all said cam plates in unison as a result of the actuation of any one of said push rods, said rotation being limited so that only one pin is projected from the selected element.

20. In selecting mechanism for selecting one or more units from a group such as certain records in a multiple record phonograph, in combination, a plurality of elements each having a plurality of radially movable pins spaced around and projectable from the periphery thereof, a rotatable shaft having said elements fixed thereto with the pins in alignment, cam plates freely rotatable on said shaft and having association with an element respectively, means positioned between each element and its cam plate holding said plate inoperative with respect thereto, a push rod for each cam plate for operatively positioning the plate with respect to its element, each plate having means thereon whereby upon rotation of the plate the pins will be projected from its element in sequence, said cam plates each having a plurality of spaced projections extending from their periphery and equal in number to the units in the group, a plate member having movement in a direction toward the cam plates upon actuation of any one of said push rods, whereby said plate member will engage a projection on each cam plate to rotate said plates in unison a limited extent so that only one pin is projected from the selected element.

21. In selecting mechanism for selecting one or more units from a group such as certain records in a multiple record phonograph, in combination, a plurality of elements each having a plurality of radially movable pins spaced around and projectable from the periphery thereof, a rotatable shaft having said elements fixed thereto with the pins in alignment, cam plates freely rotatable on said shaft and having association with an element respectively, means positioned between each element and its cam plate holding said plate inoperative with respect thereto, a push rod for each cam plate for operatively positioning the plate with respect to its element, said plate having a cam thereon for coaction with the pins of said element, whereby upon rotation of the plate the pins will be projected from its element in sequence, means including a plate member arranged to cause rotation of all said cam plates in unison as a result of the actuation of any one of said push rods, said rotation being limited so that only one pin is projected from the selected element, and means rendering the plate member inoperative to produce rotation of said cam plates.

22. In selecting mechanism for selecting one or more units from a group such as certain records in a multiple record phonograph, in combination, a plurality of elements each having a plurality of radially movable pins spaced around and projectable from the periphery thereof, a rotatable shaft having said elements fixed thereto with the pins in alignment, cam plates freely rotatable on said shaft and having association with an element respectively, means positioned between each element and its cam plate holding said plate inoperative with respect thereto, a push rod for each cam plate for operatively positioning the plate with respect to its element, each plate having means thereon whereby upon rotation of the plate the pins will be projected from its element in sequence, a plate member for rotating all said cam plates in unison upon actuation of any one of said push rods, said rotation being limited so that only one pin is projected from the selected element, and an indexing member for rotating said elements and said cam plates in unison and in the same direction but which is opposite to the rotation for projecting a pin.

23. In an automatic phonograph, a stack of record carriers, each movable to and from a playing position over a turntable, means for moving the carriers to and from said position, a selector adjustable along the stack of record carriers for connecting a selected carrier to said means, selecting mechanism capable of selecting a plurality of records, including elements corresponding in number to the record carriers and having pins radially projectable from the periphery thereof, means for each element for projecting a pin therefrom on each actuation, said means operating so that pins projected from the selected elements will be angularly spaced an equal distance, a rotatable member operatively connecting with said selector and having fingers spirally arranged along its length for contact with the projecting pins of said elements, whereby the selecting mechanism controls the operation of the selector and the records are played according to the selection of the elements as indicated by the pins projecting therefrom, and means operated by the phonograph following the playing of a selected record to cause limited bodily movement of the rotatable member, whereby the finger of said member in contact with the projecting pin corresponding to the record played will depress said pin.

24. In an automatic phonograph, a stack of record carriers, each movable to and from a playing position over a turntable, means for moving the carriers to and from said position, a selector adjustable along the stack of record carriers for connecting a selected carrier to said means, selecting mechanism capable of selecting a plurality of records, including elements corresponding in number to the record carriers and having pins radially projectable from the periphery thereof, means for each element for projecting a pin therefrom on each actuation, said means operating so that the pins projected from the selected elements will be angularly spaced an equal distance, a rotatable member operatively connecting with said selector and mounted for limited bodily movement, said member having fingers spirally arranged along its length for contact with projecting pins of said elements, whereby the selecting mechanism controls the operation of the selector and the records are played according to the selection of the elements as indicated by the pins projecting therefrom, means operated by the phonograph following the playing of a selected record to cause bodily movement of said rotatable member, whereby the finger of said member in contact with the projecting pin corresponding to the record played will depress said pin, and other means for imparting an indexing movement to said elements after said projecting pin has been depressed.

CARL G. FREBORG.
CHARLES A. FREBORG.